United States Patent [19]
Fujita et al.

[11] 3,755,249
[45] Aug. 28, 1973

[54] PERMANENTLY ANTISTATIC AND MELT-SPINNABLE POLYAMIDE COMPOSITIONS

[75] Inventors: Yutaka Fujita; Takao Ashida; Keiichi Moriyama; Eiichi Hashimoto, all of Iwakuni, Japan

[73] Assignee: Teijin Limited, Osaka, Japan

[22] Filed: Nov. 29, 1971

[21] Appl. No.: 203,030

[30] Foreign Application Priority Data
Nov. 27, 1970  Japan............................ 45/104615
June 2, 1971   Japan............................ 46/38467
June 4, 1971   Japan............................ 46/39207
June 16, 1971  Japan............................ 46/43175

[52] U.S. Cl. 260/45.75 R, 260/32.6 N, 260/45.75 N, 260/45.75 K, 260/45.95 H, 260/78 S
[51] Int. Cl................ C08g 51/58, C08g 51/00
[58] Field of Search............ 260/32.6 N, 78 S, 260/45.75 N, 45.75 K, 45.95, DIG. 15, DIG. 21; 8/172, 178

[56] References Cited
UNITED STATES PATENTS

| | | | |
|---|---|---|---|
| 3,317,452 | 5/1967 | Louis | 260/32.6 |
| 3,654,235 | 4/1972 | Crovatt et al. | 260/78 |
| 3,591,563 | 7/1971 | Barie et al. | 260/78 |
| 3,654,223 | 4/1972 | Thompson | 260/45.95 |
| 3,163,492 | 12/1964 | Thomas | 260/45.75 |
| 3,573,244 | 3/1971 | Wilken et al. | 8/172 |
| 3,189,575 | 6/1965 | Horn | 260/45.75 |

FOREIGN PATENTS OR APPLICATIONS
347,979  9/1960  Switzerland

OTHER PUBLICATIONS
Chemical Abstracts, Vol. 55, No. 16007(i) and 16008(a) of Swiss Patent 347,979.

Primary Examiner—Donald E. Czaja
Assistant Examiner—V. P. Hoke
Attorney—Leonard W. Sherman, Edwin A. Shalloway et al.

[57] ABSTRACT

Polyamide compositions having excellent melt-spinnability and durable antistatic property, while fully retaining the favorable properties inherent in polyamides, which comprises a polyamide containing as an antistatic agent one which comprises (A) a polyalkylene oxide-added secondary alkylamine and (B) a polyalkylene oxide-added tertiary alkylamine, the secondary alkylamine (A) occupying 5 – 50 percent by weight based on the sum weight the above compounds (A) and (B), and the antistatic agent being incorporated in an amount of 1 – 15 percent by weight based on the weight of the polyamide.

10 Claims, No Drawings

PERMANENTLY ANTISTATIC AND MELT-SPINNABLE POLYAMIDE COMPOSITIONS

This invention relates to polyamide compositions which show excellent melt spinnability and durable antistatic property, while fully retaining the favorable properties inherent in polyamides, e. g., high mechanical properties and dye affinity, etc. The excellent melt spinnability of the polyamide compositions of the invention is exhibited by evenness of melt-spun filaments, stable and smooth feeding of the molten polyamide compositions, good spinning conditions because of reduced adhesion of the molten polyamide composition to the surfaces around the exits of nozzle orifices, and reduced mutual adhesion among the as-spun filaments.

More particularly, the invention relates to the fiber-forming polyamide compositions containing an antistatic agent, which is characterized in that the antistatic agent is composed of:

A. A polyalkylene oxide-added secondary alkylamine of the formula,

in which R stands for a hydrogen atom or methyl radical, $n$ stands for a positive integer of not less than 10, and $p$ stands for a positive integer, preferably a positive integer not less than 10, The mol number of added polyalkylene oxide groups equalling the $p$, and B. A polyalkylene oxide-added tertiary alkylamine of the formula,

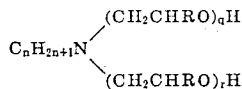

in which R and $n$ have the same definitions as given above, and $q$ and $r$ are each a positive integer, preferably $(q + r)$ is a positive integer not less than 15, the mol number of the added polyalkylene oxide groups equalling $(q + r)$, i. the above positive integers, $n$, $P$, $q$, and $r$ satisfying the relationship below;

2.5, preferably 2.0 $\geq$ $(p+q+r)/2n$ $\geq$ 0.5, preferably 0.8, i.e., $(p+q+r)/2n$ is between 0.5 and 2.5 and ii. the secondary alkylamine of (A) above occupying 5 – 50 percent by weight, preferably 15 – 35 percent by weight, of the total of (A) plus (B), and the total of (A) + (B) occupying 1 – 15 percent by weight, preferably 1.5 – 7 percent by weight, of the polyamide.

It is known that the photo-stabilizing effect of 2-(2'-hydroxy-5-methylphenyl) benzotriazole for synthetic resin products can be further promoted by the concurrent use with the above benzotriazole derivative of at least one antistatic agent of the formula,

where in, R' represents aklyl radicals of 6 to 22 carbons, R'' represents a hydrogen atom or methyl radical, $m$ represents a positive integer of 1 – 6, and $n'$ is 0 or 1, such as proposed in French Patent No. 1,581,994 which was published on Sept. 19, 1969.

The specified French patent disclosed, as the exemplary synthetic resins of which the photo-stability could be so conspicuously improved by the incorporation of the benzotriazole derivative and the specified antistatic agent, polyesters, polyolefins, and vinyl or vinylidene type polymers, and in its Examples, polystyrene was used to illustrate the effect of such incorporation. However, absolutely no disclosure was made as to the similar incorporation to polyamide resins. Again the compounds of the formula, $R'CON[CH_2-CHR''O)_mH]_{n'}$ $_{2\text{–}4}H_{2-n'}$, are different from any of the compounds (A) and (B) employed in this invention. Furthermore, they have the action to depolymerize polyamides, and therefore can never be used to achieve the objects of the present invention. Again the scope of the compounds expressed by the formula, $R'N[CH_2CHR''O)_mH]_{n'}$ $H_{2-n'}$, of the named prior art could overlap with the scope of the compounds (A) and (B) of this invention. However, the only two specific compounds within the above formula disclosed in the prior art, which are also within the scope of the compounds (B), are N-octyldiethanolamine and N-dodecyldiethanolamine. Thus the prior art is entirely silent as to compounds (A), or the concurrent use of compounds (A) and (B).

Still another prior art (Belgian Patent No. 741,324 published on Apr. 16, 1970) proposed to incorporate with a polyamide the compound (a) of the formula

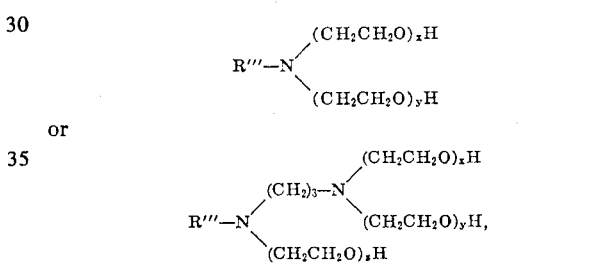

in which R''' stands for an alkyl or aralkyl of 4 to 25 carbons, and $(x + y)$ in the first formula and $(x + y + z)$ in the second formula are 10, and a sterically hindered phenol (b), for prevention of decoloration of polyamide fibers, especially Nylon 6 and 66 fibers, colored with anthraquinone dyes.

In the above prior art, the compounds expressed by the latter formula are entirely different from either of the compounds (A) and (B) employed in this invention, while the compounds of the former formula somewhat overlap with the scope of compounds (B). However, the prior art neither discloses nor even remotely suggests the utility of compounds (A), or the concurrent use of compounds (A) and (B).

There is also another prior art (U. S. Patent No. 3,541,041, patented on Nov. 17, 1970) which teaches the utilization of compounds represented by the formula,

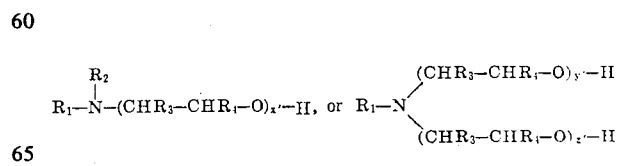

in which $R_1$ stands for a saturated or unsaturated aliphatic radical having at least 12 carbon atoms, $R_2$ stands for an alkyl, cycloalkyl, aryl, or aralkyl radical, $R_3$ and $R_4$ each stand for a hydrogen atom or alkyl radical, and x', y' and z' each represent a whole number from 1 to 100, as the mold parting or releasing agent for polyamide molding compositions.

In the above proposal, the compounds of the first formula are entirely different from either of the compounds (A) and (B) employed in this invention. However, the compounds of the second formula could in some part overlap with the scope of the compound (B) of this invention. The prior art, however, again neither discloses nor suggests the utilization of compound (A) or the concurrent use of compounds (A) and (B).

We have been engaging in research work on the static charge-preventing effect of polyalkylene oxide-added alkylamines for polyamide, and discovered that the incorporation of the already specified compounds (A) and (B) in polyamide compositions under the conditions satisfying the specific requirements of this invention, can provide polyamide compositions which exhibit durable antistatic property and excellent melt-spinnability while fully retaining the favorable properties inherent in polyamide resins, such as good mechanical properties and high dye affinity, etc. We further discovered that the incorporation of either one of the compounds (A) and (B) or their concurrent incorporation under the conditions outside the scope of this invention can not provide such polyamide compositions having a durable antistatic property while exhibiting practical melt-spinnability.

Accordingly, the object of the present invention is to provide polyamide compositions which exhibit durable antistatic property and excellent melt-spinnability, without sacrificing the favorable properties inherent in polyamides, such as good mechanical properties, high dye affinity, etc.

Still many other objects and advantages of the invention will become more apparent from the following description.

In the specification and claims, the term, "polyamide compositions" is used in the sense including the starting compositions for melt-spinning such as powder, granule, pellet, etc., as well as the filamentary products prepared from such compositions through melt-spinning, such as filaments, staples, fibers, yarns, tows, slivers, etc., and fibrous structures made of such filamentary products, e. g., knitted fabrics, woven fabrics, non-woven fabrics, webs, mats, carpets, etc.

In the invention, the most preferred polyamides are polycaproamide and polyhexamethylene adipamide. Next come polyethanthoamide, polyundecanamide, polydodecamide, polyhexamethylene azelamide, polyhexamethylene sebacamide, polyhexamethylene dodecamide, and polyxyleylene adipamide. Also preferred to a lesser degree are blend polyamides composed of two or more polyamides mentioned above, and blends of not less than 70 percent by weight of such polyamides or blend polyamides with other polymers such as polystyrene, polyethylene or polyesters composed mainly of polyethylene terephthalate. Furthermore, copolymers containing the recurring structural units forming the foregoing polyamides as the recurring units of main molecular chains, such as copoly(caproamide-hexamethylene adipamide), copoly(caproamide-hexamethylene terephthalamide), copoly(caproamide-hexamethylene isophthalamide), copoly(caproamide-xylylene adipamide), copoly(hexamethylene adipamide-terephthalamide), copoly(hexamethylene adipamide-sebacamide), or copoly(caproamide-hexamide-hexamethylene adipamide-hexamethylene terephthalamide may also be used. It is again permissible that the polyamides are those prepared by polymerization under the addition of amines or carboxylic acids for stabilizing the melt viscosity.

The concurrent utilization of the two types of polyalkylene oxide-added alkylamines (A) and (B) as below-specified is essential for the polyamide compositions of this invention. As demonstrated in the later-given Controls and Comparative Examples, omission of either one of the compounds or use of different combinations can never achieve the objects of this invention:

A. Polyalkylene oxide-added secondary alkylamine of the formula,

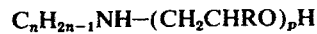

$$C_nH_{2n-1}NH-(CH_2CHRO)_pH$$

in which R is a hydrogen atom or methyl radical, preferably hydrogen, n is a positive integer not less than 10, preferably 10 – 30, and p is a positive integer, preferably a positive integer not less than 10, more preferably 10–45, the mol number of added polyalkylene oxide equalling p; and B. polyalkylene oxide-added tertiary alkylamine of the formula,

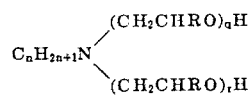

in which R and n have the same definitions as those already given for compound (A), and q and r are each a positive integer, preferably (q + r) is a positive integer of not less than 15, more preferably 15 – 50, the mol number of added polyalkylene oxide equalling (q + r).

In the present invention, it is again essential that the concurrent use of the compounds (A) and (B) is effected under the conditions satisfying the following requirements (i), (ii) and (iii), i. e., i. That in compounds (A) and (B), n, p, q, and r must satisfy the relationship below:

2.5, preferably 2.0 ≧ (p+q+r)/2n ≧ 0.5, preferably 0.8, i.e. (p+q+r)/2n is between 0.5 and 2.5 ii. That the secondary alkylamine (A) occupies 5 – 50 percent by weight, preferably 15 – 35 percent by weight, of the total weight of compounds (A) and (B), and preferably iii. That p, q and r must satisfy the following relationships:

p is between 10 and 45, and (q+r) is between 15 and 50

Furthermore, it is necessary for the invention that the sum-weight of compounds (A) and (B) corresponds to 1 – 15 percent, preferably 1.5 – 7 percent, of the weight of the polyamide.

If the carbon number of alkyl group in the polyalkylene oxide-added alkylamines (A) and (B), i. e., $n$, is less than 10, even if the above conditions (i) and (ii) and the required total content of (A) and (B) to the polyamide are all satisfied, the resulting polyamide compositions exhibit unsatisfactory durability in their antistatic property.

If the above condition (i) is not met, e. g., if $(p + q + r)/2n$ is less than 0.5, excessively large amounts of (A) and (B) must be incorporated in the polyamide to impart the desired practical degree of antistatic property, at the cost of favorable physical properties of the polyamide. Also a tendency appears that the spinning operability is progressively impaired due to the molten polyamide composition adhering to, and consequently contaminating, the surfaces around the exits of nozzle orifices. In extreme cases, an appreciable amount of filaments break during the spinning, shortly after the melt-spinning operation is started.

If $(p + q + r)/2n$ is greater than 2.5 in the polyamide compositions an increase in the rotation rate of the extrusion screw of the melt-spinning machine will not result in the corresponding increase in the discharge rate of the malt. Thus stable and smooth feeding of the molten polyamide compositions to the nozzle head becomes impossible. Also the drawability of the molten polyamide composition as spun through the nozzle orifices is impaired, and evennness of nelt-spun filaments is damaged, more or less reducing the commercial value of the product. In extreme cases, the filaments have no practical value.

When the polyamide compositions fail to meet the foregoing requirement (ii), i. e., the secondary alkylamine (A) incorporated is less than 5 percent by weight based on the total weight of (A) plus (B), a unique phenomenon occurs that the extruded mass of molten polyamide composition in the vincinity of exit of spinning nozzle vibrates with short periods (irregular melt-fracture phenomenon) during the melt-spinning, even if all other requirements are met. Such phenomenon hinders satisfactory spinning operation, and evenness of melt-spun filaments is reduced. If the secondary alkylamine (A) of more than 50 percent by weight of (A) plus (B) is incorporated in the polyamide, the as-spun filaments tend to mutually adhere to interfere with satisfactory spinning operation, even if all other requirements are fully met.

The objects of the invention can not be accomplished if the sum weight of (A) plus (B) incorporated to polyamide is outside the specified range of this invention, even if all other requirements are satisfied. That is, if the sum weight is less than 1 percent based on the weight of the polyamide, a practical degree of static charge-preventing effect cannot be obtained. Also, if it is greater than 15 percent, the melt-spinnability of the polyamide composition is impaired, without the corresponding increase in the static charge-preventing effect.

The above described requirements specified by the invention are the necessary combination of conditions for providing polyamide compositions having a durable antistatic property and excellent melt-spinnability, while fully retaining the inherent, favorable properties of polyamides, e. g., good mechanical properties, high adaptability to dyes, etc. Deviation from any one of the requirements, therefore, is fatal to the intended effects of this invention.

In the specified polyalkylene oxide-added secondary and tertiary alkylamines (A) and (B), the alkyl radical expressed as $C_nH_{2n-1}$ may be, for example, lauryl, cetyl, stearyl and behenyl. Also as the polyalkylene oxide unit in the compounds, (A) and (B), which is expressed as $(CH_2CHRO)$, a polyethylene oxide unit, polypropylene oxide unit, and ethylene oxide-propylene oxide copolymer unit in which ethylene oxide and propylene oxide are randomly- or block-copolymerized, may be named as specific examples.

The mixture of compounds (A) and (B) to be incorporated with the polyamide compositions of the invention may be formed by blending the two at such quantitative ratios as will satisfy the aforesaid requirement (ii). Or, by suitably selecting the reaction conditions for making those compounds, a satisfactory mixture can be formed as the product of single stage reaction. For instance, a satisfactory blend of (A) and (B) can be obtained by suitably selecting the reaction conditions of ring-opening addition polymerization of an alkylene oxide, e. g., ethylene oxide and/or propylene oxide, to an alkylamine of not less than 10 carbon atoms. More specifically, for example, the intended mixture of compounds (A) and (B) can be obtained by reacting an alkylamine of not less than 10 carbon atoms with ethylene oxide and/or propylene oxide in the presence of an alkali catalyst such as potassium hydroxide at a temperature of 180° – 190°C. under an elevated pressure.

The incorporation of compounds (A) and (B) in the polyamide in accordance with this invention can be effected at only optional stage before extrusion of the molten polyamide to form, for example, pellets, filaments, etc.

For Example, the compounds (A) and (B) can be added at an optional stage of preparation of the fiber-forming polyamide inclusive of the polymerization step, e. g., to the monomer before the polymerization, at the initiation, midst, and at the last stage, of the polymerization. Or, they may be added to the molten polyamide after the polymerization but before the melt-extrusion (extrusion through nozzle), or they may be mixed with the polyamide as solvent solutions.

The polyamide compositions according to the present invention show no substantial deterioration in the favorable mechanical properties and dye affinity inherently possessed by the starting polyamide, and furthermore no degradation in melt-spinnability which is apt to occur with addition of known antistatic agents. On the contrary, the compositions generally exhibit even better melt-spinnability compared with those of the starting polyamide, and still in addition, a satisfactory degree of durable antistatic property.

Thus the various drawbacks caused by electrification of polyamide filaments, for example, poor processibility of the filaments due to their entangling or separating tendency during knitting or weaving procedures, easy soiling with dust of cloths, carpets, etc., causing corona discharge, twining of the cloths around the wearers' bodies, etc., can be eliminated. Furthermore, the antistatic property is not impaired by washings, but is substantially permanent.

Obviously, the polyamide compositions of the invention may further contain one or more of the conventionally employed additives for polyamides, such as coloring agents, e. g., dyes and pigments; delusterants such as titanium oxide; whitening agents, dyeabilityimproving assistants; light resistance reinforcing agents, anti-flaming agents; etc.

Several examples of preferred additives for the polyamide in addition to the compounds (A) and (B) to form the polyamide compositions of still improved whiteness, dye affinity and light resistance will be hereinafter explained.

As such additives, nickel carboxylates may be named, which are suitably added within the quantitative range of 2 to 500 ppm based on the total sum of the polyamide, the secondary alkylamine (A), and the tertiary alkylamine (B). If desired, a greater amount can be used, but such is normally unnecessary. Incidentally, the above unit, "ppm," refers to the nickel concentration in the salt, not the concentration of salt itself. The salt or salts may be added at any optional stage before melt-extrusion of the polyamide compositions, similarly to compounds (A) and (B), and may be added together with, or separately from, compounds (A) and (B).

As such nickel carboxylates, nickel salts of saturated or unsaturated aliphatic mono- or di-carboxylic acids, nickel salts of alicyclic monocarboxylic acids, nickel salts of aromatic carboxylic acids and nickel salts of oxycarboxylic acids can be named. Specific examples include, for instance, nickel formate, nickel acetate, nickel laurate, nickel palmitate, nickel stearate, nickel oleate, nickel oxalate, nickel maleate, nickel naphthenate, nickel benzoate, nickel lactane and nickel citrate. Those can be used either singly or concurrently.

Among the above-named, particularly preferred nickel carboxylates are nickel acetate, nickel oxalate, nickel naphthenate and nickel benzoate.

Another example of preferred additives is chromic fluoride, which can be added in the amount preferably ranging from 0.001 – 0.1 percent by weight based on the sum of the polyamide, the secondary alkylamine (A), and the tertiary alkylamine (B). Excessive addition of chromic fluoride should be avoided because such may cause deterioration of whiteness. The suitable addition time described as to the nickel carboxylates equally applies to that of chromic fluoride.

As still other examples of preferred additives the concurrent use of the following (1) and (2) may be mentioned:

1. Phenolic anti-oxidation stabilizer with its phenolic OH linked at its ortho-position with at least one tertiary butyl radical, which has the boiling point (at one atmospheric gauge) not lower than 250°C., and
2. organotin compound of the formula, $(X)_2.S_n.(OOCZ)_2$,
   in which X and Z each is a member of the group consisting of alkyl, preferably alkyl radicals of 1 to 25 carbons; cycloalkyl, preferably cyclo-hexyl; aryl, preferably phenyl; and aralkyl, preferably benzyl; and X and Z may be the same or different.

The phenolic anti-oxidation stabilizer is preferably added in the amount ranging from 0.01 to 3 percent by weight based on the sum of the polyamide, the secondary alkylamine (A) and the tertiary alkylamine (B). The preferred amount of the organotin compound to be added concurrently ranges from 0.05 to 1 percent by weight on the same basis.

Specific examples of the phenolic anti-oxidation stabilizer include 4 methyl-2,6-di-tertiary butylphenol, 2,4-dimethyl-6-tertiary butylphenol, 2,6-di-tertiary butyl-4-hydroxymethylphenol, octadecyl-$\beta$-(3,5-di-tertiary butyl-4-hydroxyphenyl) propionate, $\beta$-(3,5-di-tertiary butyl-4-hydroxyphenyl) propionic acid amide, bis-(b 5-methyl-3-tertiary butyl-2-hydroxyphenyl) methane, 1,1-bis(2-methyl-5-tertiary butyl-4-hydroxyphenyl) butane, bis-(2-isopropyl-5-tertiary butyl-4-hydroxyphenyl) methane, bis-(2-methyl-5-tertiary butyl-4-hydroxyphenyl) sulfide, 1,1,3-tris(2-methyl-5-tertiary butyl-4-hydroxphenyl) butane, etc.

Addition of phenolic compounds having the boiling point below 250°C. should be avoided, even if their phenolic OH groups are linked with a tertiary butyl radical or radicals at its ortho-position, because such compounds will evaporate off from the polyamide composition during the latter's melt-spinning, and contaminate the vicinity around the spinning nozzle.

Also the specific examples of useful organotin compound include dimethyltin dilaurate, dimethyltin distearate, di-n-butyltin dilaurate, di-n-butyltin distearate, di-n-butyltin dibehenate, di-n-butyltin dinaphthate, di-n-butyltin dibenzoate, di-n-butyltin bis(phenylacetate), di-n-butyltin bis($\beta$-phenylpropionate), di-n-octyltin dicaproate, di-n-octyltin dilaurate, di-n-octyltin distearate, di-n-octyltin dinaphthenate, di-n-octyltin dibenzoate, dicychohexyltin dilaurate, dicyclohexyltin distearate, diphenyltin dilaurate, diphenyltin dibenzoate, dibenzyltin dilaurate, dibenzyltin distearate, and dibenzyltin dibenzoate, etc.

More than one of those stabilizers and organotin compounds may be used concurrently, and the suitable time of their incoporation in the polyamide is the same as that of the already described nickel carboxylates.

The norms of evaluating melt spinnability in this invention are evenness of melt-spun filaments (evenness); stable and smooth feeding of molten polyamide composition (feed-suitability); degree of deterioration in spinnability due to the adhesion and contamination of the molten polyamide composition leaving the nozzle orifices onto the surfaces around the orifice exits (cap-soiling property); and the degree of mutual adhesion among as-spun filaments (filament adherability).

The test methods and evaluation methods of the melt-spinnability and antistatic property of the polyamide compositions employed in this invention will be explained below. In the later given Examples, Conrols, and Comparative Examples, the compositions' evenness, feed-suitability, cap-soiling property, filaments adherability and antistatic property were tested and evaluated according to the below-described methods.

I. Melt-spinnability

The following tests (a) to (d) are performed using a well-known extruder type melt-spinning apparatus in which an extruder having a screw diameter of 45 mm is connected to a gear pump having a volume of 0.675 cc/revolution through a throat portion, and filter parts are provided between the outlet of the gear pump and the spinneret.

Specification of the spinneret:

| | |
|---|---|
| Number of holes | 12 |
| Hole diameter | 0.4 mm |
| Land length at the nozzle portion | 0.2 mm |

The standards for the practice of spinning using the above-mentioned type spinning apparatus will be shown below as to the case of spinning a polyamide composition consisting mainly of polycaproamide having an [η] of 0.95 to 1.35.

| | |
|---|---|
| Amount of extrusion at the gear pump | 12.1 g/min. |
| Throat pressure (pressure exerted on the throat portion) | 100 Kg/cm² constant |
| Speed of rotation of the screw | To be automatically controlled to maintain the throat pressure at 100 Kg/cm²G. |
| Spinning velocity | 1,000 meters/min. |
| Finishing oil | 10 % by weight aqueous solution of a spinning oil composed mainly of cosmetic oil and octyllauryl phosphate as an emulsifier |
| Pick-up of the finishing oil | 6.0% weight/undrawn filament |
| Quenching conditions | Air conditioned to 28°C. and 65% RH is blown against the extruded filaments between 7 cm and 127 cm below the spinneret at right angles thereto at a linear velocity of 20 cm/sec. The distance between 127 cm below the spinneret and the winder is air conditioned to 20°C. and 45% RH. |
| Spinning temperature (temperature of the polymer at the spinneret) | 260°C. |

(a) Evenness

"U%" values which are parameters for yarn evenness are measured using "USTER" as to undrawn filaments of a polyamide composition melt-spun under the above-mentioned spinning conditions. "U%" values are evaluated according to the following grades.

| U% | Grades |
|---|---|
| 1.0 or less | A (continuous drawing is possible for a time sufficient for practical purposes.) |
| More than 1.0 and up to 2.5 | B (because of yarn breakage, a continuous drawing operation must be interrupted frequently; not suitable for practical purposes) |
| more than 2.5 | continuous drawing is impossible; not practical) |

"USTER" is a tradename of an apparatus for measuring yarn evenness produced by Zellweger Ltd., Switzerland, and is world famous. The "USTER" used consists of a false twister, a tester, a recorder, and an integrator which operate in the following manners.

Twister: Twists are applied continuously to the sample multifilaments.

Tester: It has electrodes, and continuously measures the variations in cross sectional area of the sample multifilaments when the filaments are fed continuously between the electrodes, and converts them to variations in voltage.

Recorder: It records on paper the continuous variations in voltage indicated by the tester.

Integrator: it automatically indicates the mean deviation U percent expressed by the following equation.

$$U\% = \frac{100}{\overline{X}} \cdot \frac{1}{L} \int_0^L |Xi - \overline{X}| dl$$

$$\overline{X} = \frac{1}{L} \cdot \int_0^L Xi \, dl.$$

Xi: instantaneous value of the cross-section of the sample multi-filament.

L : length of the sample multi-filament over which the U% values are determined dl: differential of the length b. Feed-suitability The number of rotation of the screw necessary for extruding a molten polyamide composition of an amount sufficient for maintaining the throat pressure at 100 Kg/cm²G. constant at the end of 24 hours after initiation of the melt-spinning described above is measured using the sample polyamide composition. The number of rotation is evaluated according to the following grades.

| Number of screw rotation | Grades |
|---|---|
| 60 r.p.m. or less | A (practical continuous spinning possible for long periods of time) |
| exceeding 60 r.p.m. but less than 120 r.p.m. | B (practical continuous spinning hardly possible) |
| 120 r.p.m. or more | C (practical continuous spinning impossible) |

(c) Cap-soiling property

The number of continuously spinnable hours under the above conditions between the initiation of the operation and occurrence of filament breakage (breaking of not less than one filament among the total 12 filaments) is measured as to each sample composition. The results are evaluated by the following three-grades method.

| Continuously spinnable period (hrs) | Grade (evaluation) |
|---|---|
| Not less than 24 | A (practical continuous spinning possible) |
| 12 - less than 24 | B (practically imoperable unless the continuous spinning is occasionally interrupted) |
| No longer than 12 | C (practical continuous spinning operation impossible) | d. Cohesion of filaments

Determined how many filaments and/or multifilaments the sample multifilament (12 filaments) are divided into. Evaluation is made according to the measured values.

Twenty five samples, undrawn multifilaments, are gathered and set with paraffin. The bundle is then cut with a microtome, and the cut sections are observed by an optical microscope (200 magnifications). Measurement is made as to how many single filaments or coagulated multifilaments the 25 multifilaments (300 filaments) are divided into. 1/25 of the number of these independent filaments or independent multifilaments will be called the number of divided filaments. The number of divided filaments is evaluated according to the following grades.

| Number of divided filaments | Grades |
|---|---|
| 8 or more | A (releasing of the undrawn filament bobbin is smooth, and the drawability is good) |
| more than 3 and less than 8 | B (releasing of the undrawn filament bobbin is not smooth, and the drawability is poor) |
| 3 or less | C (releasing of the undrawn filament bobbin is not smooth, and the drawn yarn has no commercial value) |

II. Antistatic property:

The drawn filaments obtained through the melt-spinning and drawing of each sample polyamide composition incorporated with antistatic agent are washed for 30 minutes with an aqueous solution of 60°C. which contains 2 g/$l$ of "Scoreroll 400" (tradename for polyethyleneoxide dialkylether: a non-ionic surface active agent produced by Kao Soap Co., Ltd.) and 1 g/$l$ of sodium carbonate, thoroughly rinsed with water, and dried at 80°C. Thus washed filaments are classified as one-washing samples, and those so washed 10 times repeatedly as ten-washing samples. The specific resistance ($\Omega$) of each sample is measured at 20°C. and 65 % RH.

The measured values as to the 1- and 10-washing samples are given concurrently with the results of similar measurements as to the polyamide containing no antistatic agent, as the means to evaluate the antistatic property and its durability.

III. Fiber Properties

1. Tenacity and Elongation

JIS L-1070 and L-1073. Using the sample multifilament having a length of 20 cm, the test is performed using a constant speed constant length type tester at a stretch speed of 100 percent stretch/min.

2. Young's modulus

JIS L-1073. Using the sample multiflament having a length of 20 cm, the test is performed using a constant speed constant length type tester at a stretch speed of 20 percent stretch/min.

3. Dye absorption

This is the percent by weight of a dye, Supranol Cyanine G (acid dye, product of Farbenfabriken Bayer AG), absorbed by drawn filaments of a polyamide composition based on the amount of the dye initially used. The sample polyamide compositions having larger dye absorption are better in dyeability.

The amount of dye absorbed by the dyed drawn filaments can be calculated by measuring the optical density of a meta-cresol solution of the dyed drawn filaments at 620 m$\mu$.

The dyeing is performed after subjecting the drawn filament of the polyamide composition sample to the same washing as conducted for measurement of the specific resistance (ohm), dried, and weighed. The dyeing conditions are as follows:

Temperature: 70°C. ± 0.5°C.
Time: 210 hours
Goods-to-liquor ratio: 3:1000
Dye aqueous solution: Supronal Cyanine G is dissolved in distilled water to a concentration of 10 % by weight, and with the addition of a Michaelis type buffer solution, the pH of the aqueous solution is adjusted to 5.

Incidentally, the intrinsic viscosities [$\eta$] of polyamides given in this specification are invariably measured in meta-cresol solution at 35°C. Also in the following Examples and Controls., percents and parts are by weight, unless otherwise specified.

Example 1

Three (3.0) parts of a polyethylene oxide-added stearylamine mixture composed of 27 percent of the secondary amine (A) and 73 percent of the tertiary amine (B) ($p+q+r= 40$; $p+q+2/2n=1.1$) were uniformly adhered onto the surfaces of Nylon-6 chips (100 parts by weight) having an [$\eta$] of 1.02. Then, the amine-adhered chips were introduced into an extruder having a screw diameter of 50 mm and melt-blended at a temperature of 260°C. (average passing time: 1 min.), and extruded into water in ribbon form. The ribbons were cooled, cut, and dried to provide a polyamide composition as chips.

The undrawn filaments obtained through melt-spinning of the above composition were drawn by means of a titanium pin, to ultimately provide a drawn fiber-formed polyamide composition of 39.0 deniers in size, composed of 12 filaments The melt-spinnability of the composition, antistatic property as well as durability thereof, and fiber properties of the drawn fiber, were as given in Table 1 below.

In Taboe 1, similar properties of the starting polyamide and drawn fiber prepared therefrom, without the incorporation of specified compounds (A) and (B) (Control), and those of the polyamide compositions incorporated with antistatic agents outside the combination (A) and (B) of this invention (Comparative Examples), are concurrently given. In the Comparative Examples, 100 parts by weight of the polyamide compositions containing 3.0 parts by weight of the antistatic agents were similarly melted and formed into chips preceding the melt-spinning operation.

TABLE 1

| Run number | Incorporated antistatic agent | | Cpd. (1)/ Cpd. (2) (weight ratio) | Fiber properties | | | | | Melt spinnabilities | | | | Antistatic property (Ω) and durability thereof | |
|---|---|---|---|---|---|---|---|---|---|---|---|---|---|---|
| | Compound (1) | Compound (2) | | Polymer | Elongation (percent) | Tenacity (g./de.) | Young's modulus (kg./mm.²) | Dye affinity (percent) | (a) | (b) | (c) | (d) | One washing | Ten washings |
| Example 1 | Polyethylene oxide-added stearyl secondary amine with added mol number 18. | Polyethylene oxide-added stearyl tertiary amine with added mol number 22. | 27/73 | Nylon-6 [η]=1.02 | 46.5 | 5.96 | 250 | 5.8 | A | A | A | A | 2.7×10⁹ | 2.3×10⁹ |
| Control | | | 0/0 | Nylon-6 [η]=1.02 | 47.0 | 5.79 | 280 | 3.6 | A | A | A | A | 5.2×10¹² | 4.2×10¹² |
| Comparative example: | | | | | | | | | | | | | | |
| 1 | Same to Example 1 | | 100/0 | do | 52.5 | 5.82 | 220 | 5.2 | A | A | B | C | 5.0×10⁹ | 2.6×10⁹ |
| 2 | | Same to Example 1 | 0/100 | do | 42.3 | 5.70 | 250 | 6.1 | C | A | A | C | 1.8×10⁹ | 1.9×10⁹ |
| 3 | Same to Example 1 | N-octyldiethanolamine | 27/73 | do | 46.2 | 3.28 | 200 | 6.8 | C | A | C | B | 8.6×10⁹ | 7.5×10¹⁰ |
| 4 | do | N-lauryldiethanolamine | 27/73 | do | 44.8 | 3.66 | 190 | 7.6 | C | A | C | O | 9.7×10⁹ | 5.3×10¹⁰ |
| 5 | do | Diethanolamide of lauric acid | 27/73 | do | 30.6 | 2.15 | 220 | 2.8 | C | A | C | B | 9.2×10⁹ | 8.2×10¹⁰ |
| 6 | N-octyldiethanolamine | Same to example 1 | 27/73 | do | 53.4 | 4.22 | 250 | 5.2 | C | A | C | B | 3.6×10⁹ | 6.6×10⁹ |
| 7 | N-lauryldiethanolamine | do | 27/73 | do | 48.2 | 4.76 | 220 | 5.8 | C | A | C | B | 4.8×10⁹ | 6.0×10⁹ |
| 8 | Diethanolamide of lauric acid | do | 27/73 | do | 42.0 | 3.65 | 190 | 4.5 | C | A | C | B | 5.4×10⁹ | 7.1×10⁹ |
| 9 | N-stearyldiethanolamine | Same to example 1 | 27/73 | do | 54.8 | 3.52 | 200 | 8.2 | C | A | C | B | 6.4×10⁹ | 4.8×10⁹ |
| 10 | Same to example 1 | N-stearyldiethanolamine | 27/73 | do | 56.2 | 4.28 | 210 | 6.0 | O | A | B | B | 4.4×10⁹ | 4.6×10⁹ |
| 11 | Polyethylene oxide-added* (R'" is stearyl radical) of added mol number 10. | Polyethylene oxide-added stearyl tertiary amine with added mol number 10. | 27/73 | do | 60.2 | 3.41 | 190 | 7.0 | C | A | B | B | 5.6×10⁹ | 9.2×10¹⁰ |
| 12 | Polyethylene oxide-added** (R₁ is stearyl, R₂ is methyl) with added mol number 18. | Same to example 1 | 27/73 | do | 48.5 | 5.77 | 240 | 6.5 | C | A | A | A | 3.8×10⁹ | 2.5×10⁹ |
| 13 | Same to example 1 | Polypropylene oxide-added stearyl secondary amine of added mol number 22. | 27/73 | do | 54.2 | 5.48 | 230 | 5.0 | A | A | A | C | 9.5×10⁹ | 9.6×10⁹ |
| 14 | Polypropylene oxide-added stearyl tertiary amine of added mol number 18. | Same to example 1 | 27/73 | do | 46.0 | 5.54 | 250 | 5.7 | C | A | A | A | 3.2×10⁹ | 3.5×10⁹ |

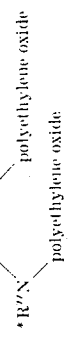

*R'" — N(—(CH₂)₃—N—polyethylene oxide)₂ / polyethylene oxide

**R₁—N—(polyethylene oxide) / R₂

Examples 2 – 10

A polyethylene oxide-added alkyl secondary and tertiary amine mixture was uniformly adhered onto the surfaces of Nylon-6 chips of an $[\eta]$ equalling 1.05, which contained 1.5 percent of titanium oxide as a delusterant. The amines-adhered chips were melted in the extruder used in Example 1, and extruded into water in ribbon form. The ribbons were cooled, cut, and dried to provide a polyamide composition as chips.

The composition was melt-spun, and the as-spun filaments were drawn in a manner similar to Example 1 using a titanium pin, to form drawn filaments.

The above procedures were repeated while varying the conditions (i) and (ii), content of the compound (A), or sum of the compounds (A) and (B) incorporated in the polyamide, (Examples 2 – 10). The results were as shown in Table 2 below.

Also for comparison, the above variations in various conditions deviated from the specified ranges of this invention (Comparative Examples). Results of those runs together with those of the Control using the above starting polyamide (containing the titanium oxide but no antistatic agent) are concurrently given in Table 2.

TABLE 2

| Run Number | Alkyl radical | (i) $(p+q+r)/2n$ | (ii) Secondary amine content (wt. percent) | Added amount to polyamide (wt. percent) | Elongation (percent) | Tenacity (g/de.) | Young's modulus (Kg/mm²) | Dye absorption (percent) | (a) | (b) | (c) | (d) | One Washing | Ten Washings |
|---|---|---|---|---|---|---|---|---|---|---|---|---|---|---|
| Example 2 | Stearyl | 0.8 | 30 | 3.5 | 50.8 | 5.66 | 250 | 6.0 | A | A | A | A | 7.6×10⁹ | 1.1×10¹⁰ |
| Control | — | — | — | — | 46.0 | 5.91 | 250 | 8.4 | A | A | A | A | 3.8×10¹² | 8.0×10¹² |
| Comparative Example 15 | Stearyl | 0.4 | 30 | 3.5 | 54.5 | 4.88 | 240 | 6.2 | B | A | A | A | 6.8×10¹⁰ | 8.2×10¹⁰ |
| Example 3 | do | 2.1 | 30 | 3.5 | 43.8 | 6.07 | 270 | 5.1 | A | B | C | A | 5.9×10⁹ | 6.2×10⁹ |
| Comparative Example 16 | do | 2.8 | 30 | 3.5 | 52.5 | 5.52 | 250 | 4.8 | B | C | A | A | 4.2×10⁹ | 6.3×10⁹ |
| Example 4 | do | 1.4 | 15 | 3.5 | 49.3 | 5.48 | 250 | 6.2 | B | A | A | A | 5.6×10⁹ | 5.6×10⁹ |
| Comparative Example 17 | do | 1.4 | 3 | — | 51.2 | 5.60 | 250 | 6.3 | C | A | A | A | 4.0×10⁹ | 5.3×10⁹ |
| Example 5 | do | 1.4 | 35 | 3.5 | 46.2 | 5.82 | 260 | 5.8 | A | A | A | B | 5.1×10⁹ | 5.0×10⁹ |
| Comparative example 18 | do | 1.4 | 55 | 3.5 | 47.5 | 5.90 | 260 | 5.5 | B | A | A | C | 4.8×10⁹ | 5.8×10⁹ |
| Example 6 | do | 1.4 | 55 | 1.5 | 46.8 | 6.04 | 270 | 4.4 | A | A | A | A | 4.4×10¹⁰ | 6.2×10¹⁰ |
| Comparative example 19 | do | 1.4 | 55 | 0.5 | 42.3 | 6.12 | 280 | 3.9 | B | B | B | B | 1.2×10¹⁰ | 6.2×10¹⁰ |
| Example 7 | do | 1.4 | 55 | 7 | 52.7 | 4.10 | 220 | 8.8 | A | A | A | A | 1.0×10⁹ | 1.0×10⁹ |
| Comparative example 20 | do | 1.4 | 28 | 17 | 48.3 | 4.10 | 200 | 12.0 | C | C | B | B | 3.9×10⁹ | 1.0×10⁹ |
| Example 8 | Lauryl | 1.8 | 28 | 4.0 | 47.0 | 5.38 | 250 | 7.4 | A | A | A | A | 8.2×10¹⁰ | 4.6×10⁹ |
| Comparative example 21 | Octyl | 1.8 | 28 | 4.0 | 48.2 | 5.25 | 250 | 6.5 | B | A | A | A | 1.6×10¹⁰ | 1.2×10¹⁰ |
| Example 9 | Cetyl | 1.6 | 25 | 3.0 | 42.6 | 5.85 | 260 | 4.2 | A | A | A | A | 2.4×10⁹ | 2.6×10⁹ |
| Example 10 | Behenyl | 1.0 | 22 | 3.0 | 41.8 | 5.99 | 260 | 5.2 | A | A | A | A | 3.7×10⁹ | 3.8×10⁹ |

Example 11

In this Example, an antistatic agent was added to ε-caprolactam, which was then polymerized, and post-treated.

An autoclave equipped with a stirrer was charged with 100 parts by weight of ε-caprolactum, 3.0 parts by weight of the same polyethylene oxide-added stearylamine as used in Examples 6 and 7, and 2.0 parts by weight of water, and the polymerization was performed by a customary method. The polymer obtained was made into chips, and extracted with a great quantity of ion-exchanged water for 12 hours to extract and remove from the polymer 10.8 percent by weight of an insoluble component consisting mainly of unreacted ε-caprolactam. The chips having an $[\eta]$ of 1.03 after extraction were dried, and then the amount of the antistatic agent contained in the polymer chips was measured using a nuclear magnetic resonance spectrometer. It was found that 3.1 parts by weight of the antistatic agent was contained per 100 parts by weight of polycaproamide. Specifically, the amount of the antistatic agent contained in the polyamide composition of the present invention was determined by measuring the ratio of protons bonded to the carbon atom adjacent to the nitrogen atom of the amide group of the polycaproamide to proton bonded to the carbon atom adjacent to the oxygen atom of polyethylene oxide-added stearylamine.

The spinnability and fiber properties of the chips were determined in the same manner as set forth in Example 1. The results are given below.

Spinnability
a. Grade A (U%)=0.60)
b. Grade A (number of screw rotation after 24 hours, 35 r.p.m.)
c. Grade A (continuous spinning possible for 39 hours)
d. Grade A (number of divided filaments, 10)

Fiber properties: Tenacity 5.88 g/de, elongation 50.2%, Young's modulus 250 Kg/mm$^2$, dye absorption 5.9%

Antistatic properties
After one washing 1.8 × 10$^{10}$ ohms
After ten washings 2.0 × 10$^{10}$ ohms

Example 12 to 19

In each of these Examples, hexamethylene diammonium adipate was polymerized by a customary method using an autoclave equipped with a stirrer, and polyalkylene oxide-added polyalkylamine or such amine and other additives were added at various stages.

The polymerization of hexamethylene diammonium adipate in accordance with the customary method is for instance as follows: Hexamethylene diammonium adipate was heated with stirring at 240°C. for 2.0 hours under steam pressure. Then, in two hours, the heating temperature was raised from 240°C. to 280°C., and also the pressure inside the autoclave was released to 1.2 Kg/cm$^2$g. Hexamethylene diammonium adipate was further heated and stirred for 1.5 hours at this temperature and steam pressure. The product was extruded in a ribbon form into water to make chips.

The antistatic agent and/or other additives were incorporated at the following stages.

L: Incorporated into hexamethylene diammonium adipate before the initiation of polymerization.
M: Incorporated immediately after reducing the inner pressure of the autoclave to 1.2 Kg/cm$^2$G.
N: Heating under stirring was initiated at a steam pressure of 1.2 Kg/cm$^2$G, and the antistatic agent and/or other additives were added after a lapse of 1.0 hour. (further 0.5 hour heating and stirring required until the completion of the polymerization).

The polyamide composition was spun under quite the same conditions as shown in Example 1 except that the spinning temperature was 285°C. U%, the number of rotation of screw after 2 hours from the intitiation of spinning, the time during which continuous spinning was possible, and the number of divided filaments which are the measures for melt-spinnability will be given later. These values can be evaluated in accordance with the grades provided with respect to polycaproamide.

The antistatic agents or other additives used, and the time at which these agents were incorporated are shown in Table 3. The properties of the drawn filaments of the sample polyamide compositions are given in Table 3'.

Tables 3 and 3' also give the results obtained with polyhexamethylene adipamide not containing the antistatic agent or other additives.

TABLE 3

| | | Antistatic agent | | | | | Other additives | | |
|---|---|---|---|---|---|---|---|---|---|
| Run No. | Compound [A][1] | Compound [B][1] | (i) $(p+q+r)/2n$ | (ii) [A] Content (wt. percent) | Amount of [A]+[B] incorporated polyamide (wt. percent)[2] | Time of addition of antistatic agent | Type | Amount to polyamide plus [A]+[B] | Time of addition of additives |
| Ex.: 12 | POE-added stearyl secondary amine (18). | POE-added stearyl tertiary amine (24). | 1.2 | 30 | 4.0 | L | | | |
| 13 | do | do | 1.2 | 30 | 4.0 | M | | | |
| 14 | do | do | 1.2 | 30 | 4.0 | N | | | |
| 15 | do | do | 1.2 | 30 | 4.0 | L | Nickel acetate tetrahydrate. | 0.01 | L |
| 16 | POP-added stearyl secondary amine (14). | POP-added stearyl tertiary amine (36). | 1.4 | 25 | 3.0 | M | Nickel naphthenate. | 0.02 | L |
| 17 | do | do | 1.4 | 25 | 3.0 | L | Chromic fluoride | 0.01 | L |
| | | | | | | | 1,1-bis(2-methyl-5-t-butyl-4-hydroxyphenyl) butane. | 0.2 | L |
| 18 | do | do | 1.4 | 25 | 3.0 | L | Di-n-butyltindi-laurate. | 0.1 | L |
| | | | | | | | Octadecyl-3-(3.5-di-tert.butyl-4-hydrooxphenyl) propionate. | 0.3 | N |
| 19 | POE-added lauryl secondary amine (20). | POE-added lauryl tertiary amine (26). | 1.9 | 25 | 6.0 | L | Di-n-octyltin dinaphthenate. | 0.1 | N |
| Control | | | | | 0 | | | 0 | |

[1] The numeral values in the parentheses show the added mol number of polyalkylene oxide, i.e. for the compound [A], p, and for compound [B], (q+r).
[2] Amounts of ([A]+[B]) and other additives are expressed in terms of percentile ratios based on hexamethylene diammonium adipate used in polymerization.
[3] $[\eta]$=1.05.

TABLE 3'

| Run number | Fiber properties | | | | Melt spinnabilities | | | | Antistatic property and durability thereof | |
|---|---|---|---|---|---|---|---|---|---|---|
| | Elongation (percent) | Tenacity (g./de.) | Young's Modulus (kg./mm.²) | Dye absorption (percent) | (a) U, percent | (b) Number of rotation of screw (r.p.m.) | (c) Time during which continuous spinning | (d) Number of divided filaments | One washing | Ten washings |
| Example 12 | 42.3 | 5.26 | 330 | 5.8 | 0.81 | 38 | 30 | 9 | 1.8×10¹⁰ | 1.0×10¹⁰ |
| Control | 46.2 | 5.15 | 350 | 2.5 | 0.72 | 24 | 38 | 12 | 6.8×10¹² | 8.2×10¹² |
| Example: | | | | | | | | | | |
| 13 | 45.0 | 4.98 | 330 | 5.7 | 0.86 | 39 | 29 | 10 | 1.0×10⁰⁹ | 1.8×10⁰⁹ |
| 14 | 45.8 | 5.02 | 330 | 5.5 | 0.85 | 42 | 27 | 10 | 8.8×10⁰⁹ | 1.2×10¹⁰ |
| 15 | 49.8 | 5.18 | 330 | 6.2 | 0.80 | 38 | 26 | 9 | 6.8×10⁰⁹ | 1.1×10¹⁰ |
| 16 | 44.1 | 5.31 | 330 | 4.3 | 0.76 | 30 | 30 | 11 | 8.2×10¹⁰ | 9.4×10¹⁰ |
| 17 | 45.0 | 4.86 | 330 | 5.9 | 0.85 | 38 | 30 | 10 | 7.2×10⁰⁹ | 1.3×10¹⁰ |
| 18 | 45.2 | 5.40 | 340 | 4.4 | 0.80 | 44 | 32 | 10 | 9.0×10⁰⁹ | 2.4×10¹⁰ |
| 19 | 48.5 | 4.58 | 320 | 5.6 | 0.94 | 53 | 25 | 8 | 7.2×10⁰⁹ | 2.1×10¹⁰ |

Example 20 to 24

A polyalkylene oxide-added alkylamine was added to various polyamides or blend polyamides, and the mixture was melt-blended using an extruder of the type used in Example 1. Chips of the resulting polyamide composition were spun under the same conditions as mentioned above except using different spinning temperatures.

The polyamides, polyalkylene oxide-added alkylamine, the temperature of the melt blends, and the spinning temperature are shown in Table 4, and the results of spinning are given in Table 4'.

Table 4' also gives the results of spinning of polyamides not containing the antistatic agent.

TABLE 4

| Antistatic agent | | (i) (p+q+r)/2n | (ii) [A] content (wt. percent) | [A]+[B] content, percent weight | Polyamides | Temperature of melt blend | Spinning temperature | Remarks |
|---|---|---|---|---|---|---|---|---|
| [A] | [B] | | | | | | | |
| Example 20 | POE (14) added stearyl sec. amine | POP (36) added stearyl tert. amine | 1.4 | 25 | 3.0 | Polyenanthamide ([η]=1.12) | 265 | 270 | |
| Control | | | | | 0 | do | | 270 | |
| Example 21 | POP (14) added stearyl sec. amine | POE (36) added stearyl tert. amine | 1.4 | 25 | 3.0 | Polyhexamethylene azelamid ([η]=0.98) | 260 | 260 | |
| Control | | | | | 0 | do | | 260 | |
| Example 22 | POP (14) added stearyl sec. amine | POP (36) added stearyl tert. amine | 1.4 | 25 | 4.0 | Blend polyamide of 80% by weight polycaproamide ([η]=1.02)³ and 20% by weight polyethylene terephthalate ([η]=0.92). | 285 | 285 | Polycaproamide and polyethylene terephthalate were blended at 285° C. using an extruder of the type same as that used in Example 1, and the blend was then made into chips. |

TABLE 4

| | Antistatic agent | | | | | | | Temperature of melt blend | Spinning temperature | Remarks |
|---|---|---|---|---|---|---|---|---|---|---|
| | [A] | [B] | (I) $(p+q+r)/2n$ | (II) [A] content (wt. percent) | [A]+[B] content, percent weight | Polyamides | | | | |
| Control | | | | | 0 | do | | | 265 | Polycaproamide and polyhexamethylene adipamide were blended at 280° C. using an extruder of the type same as that used in Example 1, and the blend was then made into chips. |
| Example 23 | POP (18) added behenyl sec. amine | POP (26) added behenyl tert. amine | 1.0 | 22 | 3.0 | Blend polyamide of 65% by weight polycaproamide ($[\eta]=1.02$) and 35% weight polyhexamethylene adipamide ($[\eta]=1.03$). | 280 | 280 | |
| Control | | | | | 0 | do | | | 280 | |
| Example 24 | POP (18) added behenyl sec. amine | POE (26) added behenyl tert. amine | 1.0 | 22 | 2.5 | Copoly hexamethylene adipamide (80% by weight)—terephthalamide (20% by weight) ($[\eta]=1.08$). | 265 | 270 | |
| Control | | | | | 0 | do | | | | 270 |

[1] 14 polyethylene oxides added.
[2] 36 polypropylene oxides added.
[3] $[\eta]$ = measured at 35° C. with respect to ortho-chlorsophenol solution.

TABLE 4'

| Example number | Mechanical properties of drawn filaments | | | Melt spinnability | | | | Durable antistatic properties (Ω) | | |
|---|---|---|---|---|---|---|---|---|---|---|
| | Elongation (percent) | Tenacity (g./de) | Young's modulus kg./mm.² | Dye absorption (percent) | U (percent) | Number of screw rotation after 24 hours | Time during which continuous spinning was possible | Number of divided filaments | After one washing | After ten washings |
| 20 | 54.4 | 4.58 | 200 | 4.8 | 0.80 | 36 | 39 | 11 | 5.5×10⁹ | 5.8×10⁹ |
| Control | 52.0 | 4.66 | 210 | 2.7 | 0.73 | 35 | 45 | 12 | 8.8×10² | 9.1×10¹⁰ |
| 21 | 50.5 | 3.82 | 210 | 5.0 | 0.93 | 42 | 29 | 10 | 2.6×10⁹ | 2.3×10⁹ |
| Control | 48.2 | 3.80 | 230 | 4.1 | 0.84 | 32 | 40 | 12 | 7.4×10² | 7.3×10¹⁰ |
| 22 | 42.5 | 4.72 | 580 | 6.1 | 0.90 | 50 | 29 | 11 | 6.8×10⁹ | 7.5×10⁹ |
| Control | 37.5 | 4.38 | 580 | 6.3 | 0.96 | 29 | 30 | 12 | 8.5×10² | 6.6×10¹⁰ |
| 23 | 44.2 | 5.22 | 320 | 3.5 | 0.86 | 40 | 32 | 8 | 6.2×10⁹ | 6.9×10⁹ |
| Control | 44.0 | 5.16 | 310 | 3.4 | 0.88 | 24 | 38 | 9 | 3.0×10² | 3.8×10¹⁰ |
| 24 | 51.2 | 3.78 | 420 | 5.4 | 0.82 | 51 | 24 | 7 | 7.6×10⁹ | 1.8×10⁹ |
| Control | 47.5 | 4.02 | 440 | 2.8 | 0.70 | 32 | 26 | 8 | 1.4×10² | 1.1×10¹² |

We claim:

1. A fiber-forming polyamide composition containing an antistatic agent, said antistatic agent being composed of compounds (A) and (B) below:
   A. polyalkylene oxide-added secondary alkylamine of the formula, $$C_nH_{2n-1}NH-(CH_2CHRO)_pH$$

wherein R is a hydrogen atom or methyl radical,
   n is a positive integer of not less than 10, and
   p is a positive integer,
   with the mol number of added polyalkylene oxide equalling p, and
   B. polyalkylene oxide-added tertiary alkylamine of the formula,

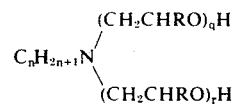

wherein R and $n$ are as defined above, and $q$ and $r$ are each a positive integer, and i. $n, p, q$ and $r$ satisfy the relationship of the expression below:

$(p+q+r)/2n$ is between 0.5 and 2.5 ii. the secondary alkylamine (A) occupies 5 – 50 percent by weight based on the sum weight of compounds (A) and (B), and said antistatic agent is present in an amount of 1 – 15 percent by weight based on the weight of the polyamide.

2. The polyamide composition of claim 1, wherein $p$, $q$ and $r$ satisfy the relationships:

$p$ is between 10 and 45 and $(q+r)$ is between 15 and 50

3. The polyamide composition of claim 1, wherein $n$, $p$, $q$, and $r$ satisfy the relationship:

$(p+q+r)/2n$ is between 0.8 and 2.0.

and the secondary alkylamine (A) occupies 15 – 35 percent by weight based on the sum weight of compounds (A) and (B).

4. The polyamide composition of claim 1, wherein the sum of the secondary alkylamine (A) and tertiary alkylamine (B) is 1.5 – 7 percent by weight based on the weight of the polyamide.

5. The composition of claim 1, wherein the polyamide composition is in the form of powder, granule, or pellet.

6. The composition of claim 1, wherein the polyamide composition is in the form of filaments or fibrous structures.

7. The compositon of claim 1, wherein the composition comprises, in addition to said secondary alkylamine (A) and said tertiary alkylamine (B), at least one nickel carboxylate in the amount of 2 – 500 ppm (as nickel concentration) based on the total weight of the polyamide, secondary alkylamine (A), and tertiary alkylamine (B).

8. The composition of claim 1, wherein the composition comprises, in addition to said secondary alkylamine (A) and said tertiary alkylamine (B), chromic fluoride in the amount of 0.001 – 0.1% by weight based on the total weight of the polyamide, secondary alkylamine (A) and teritary alkylamine (B).

9. The composition of claim 1, wherein the composition comprises, in addition to said secondary alkylamine (A) and said tertiary alkylamine (B), 1. a phenolic anti-oxidation stabilizer wherein the phenolic OH group is linked with at least one tertiary butyl radical at its ortho-position, and which has a boiling point not lower than 250°C., and 2. an organotin compound of the formula, $$(X)_2 Sn (OOCZ)_2$$

wherein X and Z are each a member selected from the group consisting of alkyl, cycloalkyl, aryl, and aralkyl radicals, and X and Z may be the same or different.

10. The composition of claim 9, wherein said phenolic anti-oxidation stabilizer is incorporated within the quantitative range of 0.01 to 3 percent by weight based on the total weight of the polyamide, secondary alkylamine (A) and tertiary alkylamine (B), and the organotin compound, from 0.05 to 1 percent by weight on the same basis.

* * * * *